United States Patent [19]

Müller et al.

[11] Patent Number: 4,490,893

[45] Date of Patent: Jan. 1, 1985

[54] FASTENING DEVICE FOR HOLDING CONSTRUCTION OR FUNCTIONAL PARTS ON COVER PLATES

[75] Inventors: Klaus Müller, Weil-Haltingen; Bernd Mutz, Schopfheim, both of Fed. Rep. of Germany

[73] Assignee: A. Raymond, Lorrach, Fed. Rep. of Germany

[21] Appl. No.: 443,147

[22] Filed: Nov. 19, 1982

[30] Foreign Application Priority Data

Nov. 23, 1981 [DE] Fed. Rep. of Germany ....... 3146376

[51] Int. Cl.³ .................... A44B 17/00; A44B 21/00
[52] U.S. Cl. .................................. 24/704; 24/295; 24/457; 24/669; 24/687
[58] Field of Search .............. 24/703, 704, 687, 457, 24/573, 458, 293, 294, 295, 662, 629, 690, 669

[56] References Cited

U.S. PATENT DOCUMENTS

| | | | |
|---|---|---|---|
| 831,179 | 9/1906 | McDonagh | 24/687 |
| 1,164,227 | 12/1915 | Seabury | 24/690 |
| 1,873,880 | 8/1932 | Hall et al. | 24/294 |
| 1,965,520 | 7/1934 | Boden | 24/573 |
| 2,208,722 | 7/1940 | Doty | 24/457 |
| 2,216,219 | 10/1940 | Wiley | 24/293 |
| 2,315,211 | 3/1943 | Kost | 24/295 |
| 2,908,059 | 10/1959 | Domenech et al. | 24/662 |
| 2,948,368 | 8/1960 | Arnold | 24/295 |
| 3,208,119 | 9/1965 | Seckerson | 24/295 |
| 4,424,612 | 1/1984 | Muller et al. | 24/66⁰ |

FOREIGN PATENT DOCUMENTS

| | | | |
|---|---|---|---|
| 1333639 | 6/1963 | France | 24/294 |
| 14306 | 8/1916 | United Kingdom | 24/295 |

*Primary Examiner*—Victor N. Sakran
*Attorney, Agent, or Firm*—Finnegan, Henderson, Farabow, Garrett & Dunner

[57] ABSTRACT

A fastening device for holding elements such as snap pins or clamps on a cover plate made of molded fiber which includes a holding plate spaced above the cover plate and having support plates fixed to opposite ends thereof by side walls. A separate intermediate plate is between the holding plate and support plates and the cover plate and has a plurality of claws adapted to penetrate the fiber plate. The intermediate plate and the holding plate are fastened together by hooks and/or snap fasteners.

3 Claims, 10 Drawing Figures

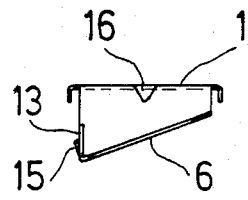
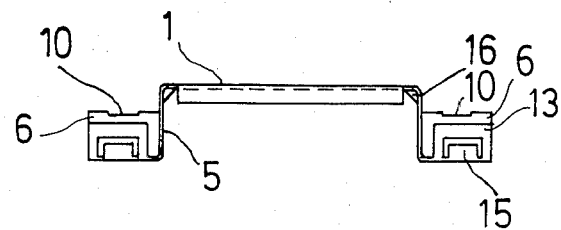
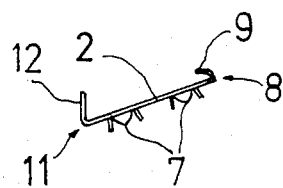
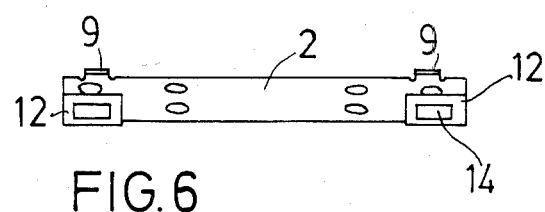
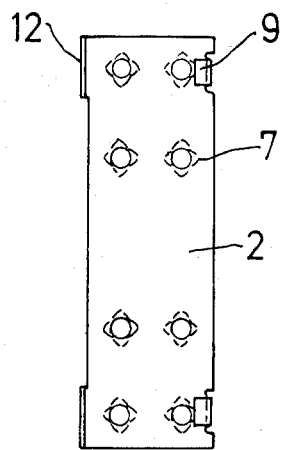
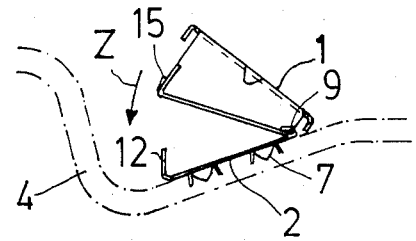
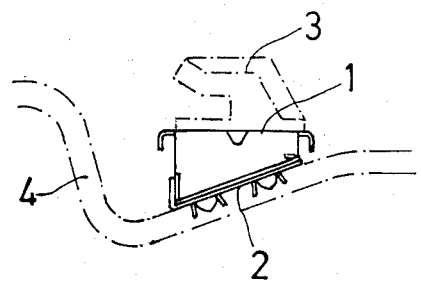

FASTENING DEVICE FOR HOLDING CONSTRUCTION OR FUNCTIONAL PARTS ON COVER PLATES

BACKGROUND OF THE INVENTION

The present invention is directed to a fastening device for holding construction or functional elements such as door panel snap pins on cover plates such as interior door and side panels on automobiles. These plates or panels usually are made from molded fibers.

One type of existing fastening device includes a holding plate which is spaced above the cover plate or panel to receive the construction or functional part, and which has support plates connected to opposite sides thereof by side walls. The support plates engage the cover plate and include cramps or claws which are tabs bent downwardly from the support plates and which can be forced into the cover plates to secure the holding plate thereto.

Such a fastening device is shown in U.S. Pat. No. 4,424,612. There, the support plates on both sides of the holding plate are provided with two stamped out claws each of which is located as close to the side walls as possible, one behind the other. The holding strength of these claws depends upon the hardness of the material of the cover plate. Where a higher holding force is required, problems are encountered in providing further claws in the available space in the support plates.

While it is possible to make the support plates larger so that they can accommodate additional claws, this is often precluded because of lack of available space. Also, the claws which are farther away from the side walls contribute only slightly to the holding force because tensional forces acting on the holding plate tending to pull it away from the cover plate act mainly on those claws which are adjacent the side walls.

SUMMARY OF THE INVENTION

It is therefore the object of the invention to provide a fastening device of the type described which has increased holding force. In the device described herein, this is achieved by using the space under the holding plate for additional claw fasteners.

The present invention provides an intermediate plate separate from the holding plate and which is disposed between the holding plate and support plates and the cover plate and is joined to the support plate by suitable means such as hook and/or snap-in fasteners. The intermediate plate engages the cover plate and is provided with claw fasteners which are forced into the cover plate. In this manner it is possible to double the number of fastening claws next to the side walls and accordingly the holding force of the fastener can be raised substantially. Furthermore, the intermediate plate can be pressed into fastening engagement with the cover plate more easily in the absence of bulky set-up parts, and the holding plate can be assembled to the intermediate plate only when needed and when ready to mount the construction or functional part. Another advantage is obtained thereby, namely that more cover plates having intermediate plates fastened in place can be stacked together than previously possible with assembled cover plates and holding plates, which is advantageous both for shipping as well as for storage at the assembly site.

Further details concerning the objects of the invention as well as its technical advantages will be discussed in the detailed description below in connection with the drawings which illustrate two embodiments of the invention.

BRIEF DESCRIPTION OF THE DRAWINGS

FIG. 1 is a side view of a holding plate embodying the present invention;

FIG. 2 is a front view of the holding plate looking from the left of FIG. 1;

FIG. 3 is a side view of an intermediate plate provided with claws for use with the holding plate of FIGS. 1 and 2 in accordance with the invention;

FIG. 4 is a front view of the intermediate plate of FIG. 3;

FIG. 5 is a top view of the intermediate plate of FIGS. 3 and 4;

FIG. 6 is a view showing the intermediate plate with its claws pressed into a molded fiber cover plate and the holding plate initially placed on the intermediate plate;

FIG. 7 shows the holding plate fully assembled to the intermediate plate, and a construction or functional part attached to the holding plate;

DETAILED DESCRIPTION

Figure 8:
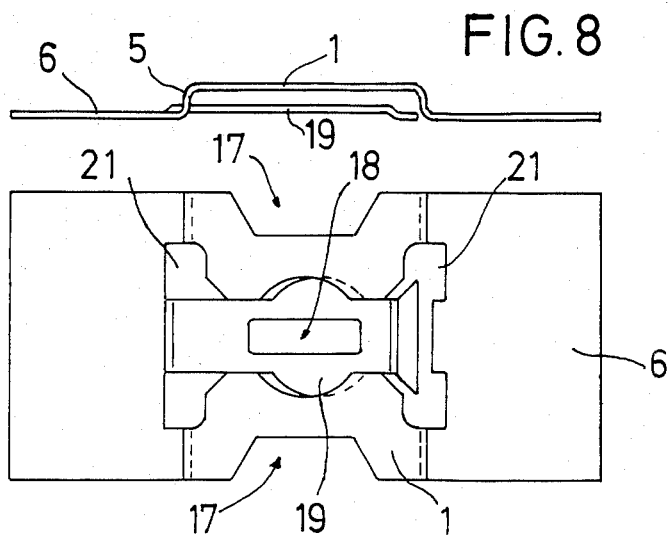
FIG. 8 is a front view and a top view of a modified form of holding plate.

The fastening device illustrated in the drawings finds particular use in motor vehicles to fix construction or functional parts or elements such as door panel hooks or snap pins in place on molded fiber cover plates such as interior door and side panels. As embodied herein and shown in FIGS. 1-5, the fastening device comprises a holding plate 1 and an intermediate plate 2. The holding plate 1 is joined at opposite ends to a pair of offset, angled support plates 6 by a pair of side walls 5. When the holding plate 1 is assembled to the intermediate plate 2, as described below, the support plates 6 engage the intermediate plate. The height of the side walls 5 and the position of the support plates 6 can vary and depends on the local conditions of installation (see FIG. 6). The side walls 5 can be stiffened against the holding plate 1 by ribs 16.

The intermediate plate 2 comprises several claws 7 which are shaped out of the plate and extend away from its lower side. The claws are used to fasten the intermediate plate 2 to a cover plate 4 constructed of molded fiber board by forcing the claws 7 into the plate 4 using pressure, and possibly applying heat. The number of claws 7 required can be determined for the holding force desired. The intermediate plate 2 is fitted by its shape to the particular available fixing area on the cover plate 4 and accordingly may be stepped if the cover plate 4 is stepped.

In accordance with the invention, fastening means are provided on support plates 6 and the intermediate plate 2 to fasten them together. As embodied herein, the intermediate plate 2 includes a pair of upwardly extending reverse bent hooks 9 along a lengthwise edge 8 which are adapted to receive the support plates 6 at offset holding rims or detents 10 (See FIG. 6). The intermediate plate also has a pair of upwardly bent wall sections 12 at the opposite edge 11 and each is provided with a substantially rectangular aperture 14 (See FIG. 4). The support plates 6 are each provided with an upwardly bent wall section 13 which is adapted to confront and engage the inside surfaces of wall sections 12 when the plates are assembled (See FIG. 7). Flexible tongues 15 struck out of the wall sections 13 project outwardly therefrom, as shown in FIG. 1, and snap into the apertures 14 of the engaged wall sections 12 during assembly of the holding plate 1 to the intermediate plate 2.

FIGS. 6 and 7 illustrate the assembly procedure for the fastening device. The intermediate plate 2 first is pressed against the cover plate 4 by means of press tools or a press ram (not shown) to cause the claws 7 to embed in the plate 4. Heat may be applied to assist in this step, if desired. It will be appreciated that the press ram is unhampered by any set-up structure and therefore can be pressed against the entire surface of plate 2. The holding plate 1 is then assembled to the intermediate plate 2 by inserting the holding rims 10 under the hooks 9, as shown in FIG. 6, and thereafter pivoting the holding plate downwardly in the direction of the arrow Z. The flexible tongues 15 are forced inwardly when they engage the wall sections 12 and then snap into the apertures 14 when the support plates 6 rest on the intermediate plate 2 (See FIG. 7). A construction or functional element 3 shown in phantom in FIG. 7 may be a hook or a snap pin and can be attached to the holding plate 1 in the usual manner.

Figure 9:
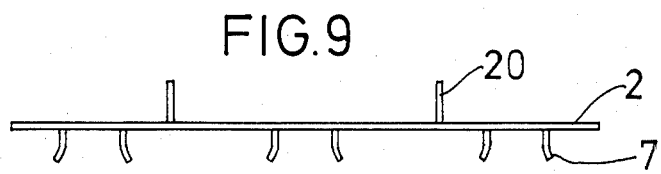
FIG. 9 is a front view and a top view of a modified form of intermediate plate used with the holding plate of FIG. 8.
Figure 10:
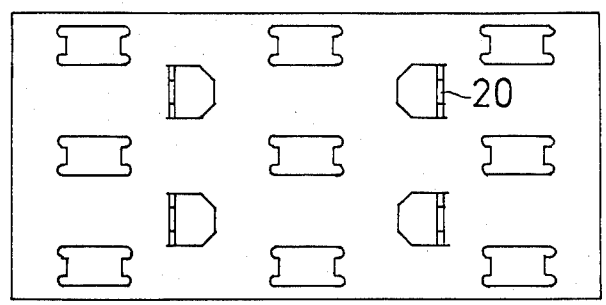
FIG. 10 shows the holding plate and intermediate plate of FIGS. 8 and 9 joined together and being pressed into a molded fiber board cover plate.

Obviously, the invention is not restricted to the described hook and snap-in connection but applies equally to other suitable fastening means. For example, as shown in FIGS. 8 through 10, upwardly bent tongues 20 can be formed on intermediate plate 2 which will penetrate corresponding slots or apertures 21 in the support plates 6. After assembly, the tongues 20 can be bent flat against the support plates 6 (FIG. 10). The preferred type of fastening means depends on manufacturing costs or the user's desired assembly.

In the embodiment shown in FIGS. 8 through 10, the intermediate plate 2 is fastened to the holding plate 1 by the illustrated tongues 20 and apertures 21 prior to being fastened to the molded fiber cover plate 4. The claws 7 provided beneath the holding plate 1 nevertheless can be pressed into the plate 4 from above with a press ram 22 and to this end, the holding plate 1 is formed with cut-outs, and further an aperture 18 is provided in a stamped support plate 19 located below the holding plate 1 for receiving the press ram 22. FIG. 10 illustrates how the claws 7 bend outwardly and burrow into the back side into the molded fiber plate 4 when pressed by the press ram.

It will be appreciated that various additions, substitutions, modifications and omissions may be made to the fastening device of this invention without departing from the scope or spirit of the invention. It is intended that these additions, substitutions, modifications and omissions be encompassed by this invention provided they fall within the scope of the appended claims and their equivalents.

What is claimed is:

1. A fastening device for securing a construction element to a panel whereby the panel can be mounted to a surface by means of such construction element, said device comprising a holding plate spaced from the panel and adapted to receive and hold the construction element, a pair of support plates offset from said holding plate and integrally joined to opposite ends of the holding plate by connecting sidewalls, and an intermediate plate having claws on one side which can be forced into the panel to secure the intermediate plate to the panel and fastening means on the opposite side of the intermediate plate that cooperate with fastening means on the support plates to fasten the plates together, the claws on the intermediate plate being located beneath both the support plates and the holding plate of the fastening device when the plates are fastened together.

2. The fastening device of claim 1, wherein the fastening means comprises a pair of upwardly extending reverse bent hooks at one edge of the intermediate plate which receive an edge of the support plates of the holding plate, a pair of upwardly bent wall sections at the opposite end of the intermediate plate with each having an aperture and upwardly bent wall sections having flexible tongues formed therein on the edge of the support plates opposite from said one edge which are adapted to engage and snap into the apertures in the wall sections of the intermediate plate to thereby fasten the plates together.

3. The fastening device of claim 1, wherein cutouts are provided in the holding plate to allow a press ram to force all the claws on the intermediate plate into the panel when the intermediate plate and support plates are fastened together before the claws are forced into the panel.

* * * * *